United States Patent [19]
Horski

[11] Patent Number: 5,675,206
[45] Date of Patent: Oct. 7, 1997

[54] SLIM-LINE BRUSHLESS MOTOR

[75] Inventor: Marek Horski, London, Canada

[73] Assignee: Siemens Electric Limited, Brampton, Canada

[21] Appl. No.: 573,809

[22] Filed: Dec. 18, 1995

[51] Int. Cl.⁶ .................... H02K 3/26; H02K 1/27
[52] U.S. Cl. .................... 310/268; 310/90; 310/42; 310/67 R; 310/156
[58] Field of Search .................... 310/268, 156, 310/152, 58, 61, 62, 63

[56] References Cited

U.S. PATENT DOCUMENTS

| | | | |
|---|---|---|---|
| 2,658,157 | 11/1953 | Brouwer . | |
| 2,832,906 | 4/1958 | Koons . | |
| 3,319,098 | 5/1967 | Hartman | 310/90 |
| 3,453,465 | 7/1969 | De Boer et al. . | |
| 3,512,025 | 5/1970 | Quellet | 310/268 |
| 3,767,949 | 10/1973 | Newill . | |
| 3,790,835 | 2/1974 | Takeda | 310/268 |
| 3,988,024 | 10/1976 | Watanabe et al. . | |
| 3,993,920 | 11/1976 | Sato . | |
| 3,997,805 | 12/1976 | Dochterman . | |
| 4,007,390 | 2/1977 | Muller et al. . | |
| 4,109,170 | 8/1978 | Fujita et al. . | |
| 4,181,867 | 1/1980 | Muller | 310/156 |
| 4,220,879 | 9/1980 | Hoshimi et al. . | |
| 4,242,608 | 12/1980 | Ishigaki et al. . | |
| 4,319,152 | 3/1982 | van Gils . | |
| 4,322,666 | 3/1982 | Muller . | |
| 4,352,036 | 9/1982 | Kuwako . | |
| 4,500,806 | 2/1985 | Kanayama et al. | 310/198 |
| 4,539,497 | 9/1985 | Boyer . | |
| 4,620,139 | 10/1986 | Egami et al. | 310/254 |
| 4,686,400 | 8/1987 | Fujisaki et al. . | |
| 4,689,507 | 8/1987 | Baker et al. | 310/62 |
| 4,701,651 | 10/1987 | Tanaka . | |
| 4,733,115 | 3/1988 | Barone et al. . | |
| 4,763,037 | 8/1988 | Hashimoto et al. | 310/268 |
| 4,788,464 | 11/1988 | Nishikawa et al. . | |
| 4,793,562 | 12/1988 | Hirmke et al. . | |
| 4,795,931 | 1/1989 | Sturm | 310/90 |
| 4,814,653 | 3/1989 | Hasegawa et al. . | |
| 4,839,551 | 6/1989 | Tomisawa . | |
| 4,851,731 | 7/1989 | Saotome et al. . | |
| 4,853,567 | 8/1989 | Muramatsu et al. . | |
| 4,978,878 | 12/1990 | Dijken . | |
| 4,980,590 | 12/1990 | Taniguchi et al. . | |
| 4,984,572 | 1/1991 | Shiraki | 310/156 |
| 4,987,333 | 1/1991 | Noguchi et al. . | |
| 5,027,025 | 6/1991 | Saneshige et al. . | |
| 5,036,235 | 7/1991 | Kleckner . | |
| 5,097,170 | 3/1992 | Baines . | |
| 5,124,604 | 6/1992 | Swartz . | |
| 5,144,183 | 9/1992 | Farrenkopf . | |
| 5,146,144 | 9/1992 | Lee . | |
| 5,245,236 | 9/1993 | Horng | 310/67 R |
| 5,252,871 | 10/1993 | Inoue . | |
| 5,349,259 | 9/1994 | Kaneko et al. . | |
| 5,396,135 | 3/1995 | Iwazaki et al. . | |

FOREIGN PATENT DOCUMENTS 952733  11/1956  Germany .................... 310/61

Primary Examiner—Thomas M. Dougherty
Assistant Examiner—B. Mullins

[57] ABSTRACT

A slim-line direct current (DC) brushless motor for automotive and HVAC applications utilizes a sleeve bearing assembly to rotatably couple an exterior rotor to an interior stator. The rotor includes a flat permanent magnetic and the stator assembly includes a flat coil. The flat coil is made from a stamped copper member. The rotor is staked to the bearing assembly by a hub-shaft. A cooling fan is disposed on the top of the rotor to cool internal control circuitry within the motor. The motor is easily assembled and has a minimal number of moving parts.

21 Claims, 4 Drawing Sheets

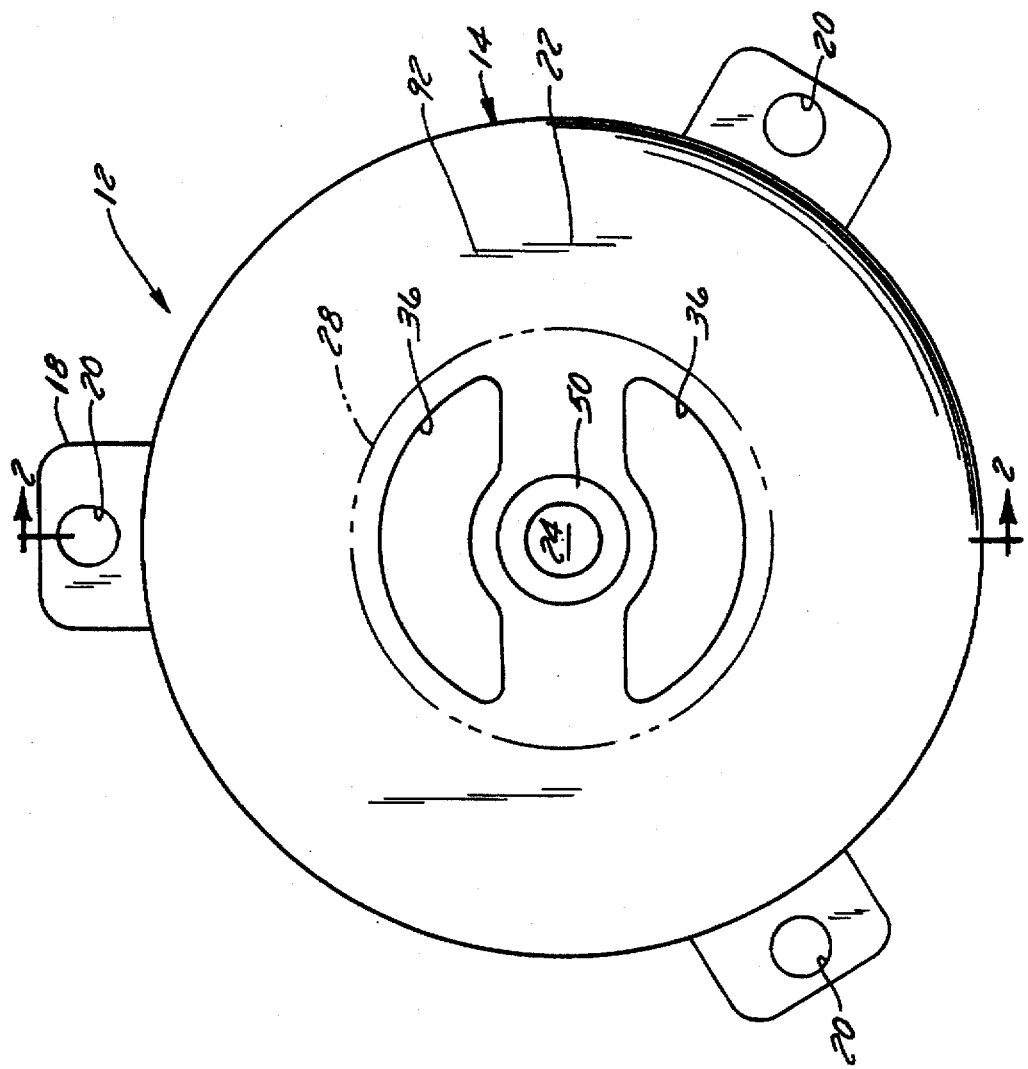
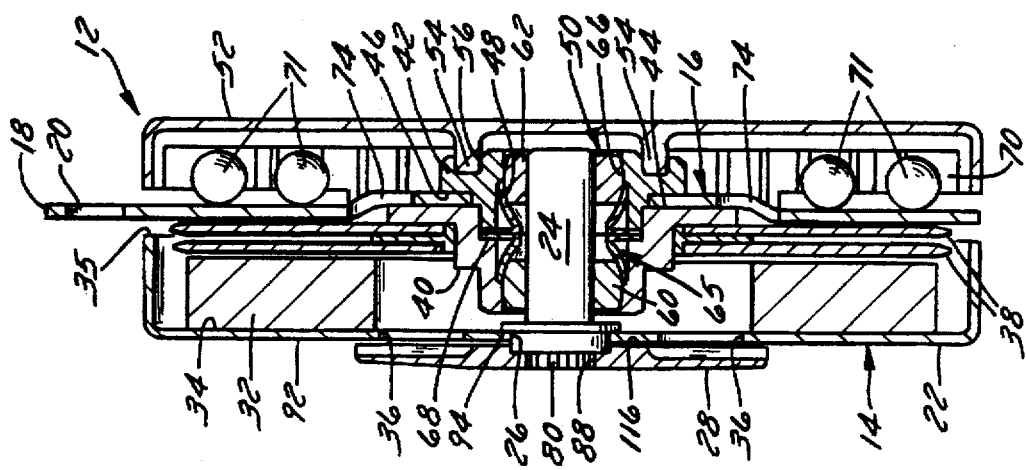

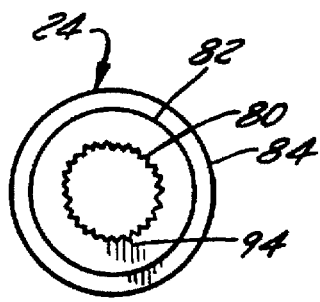
FIG. 7
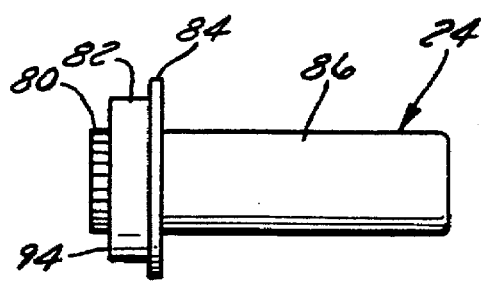
FIG. 8
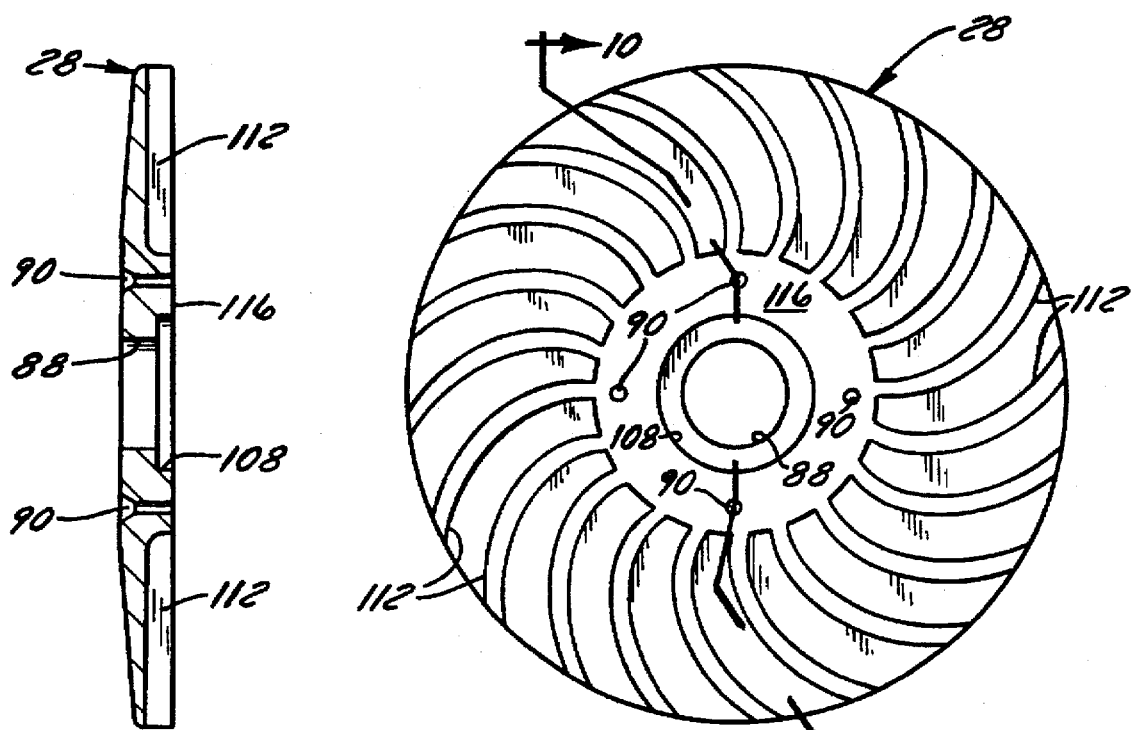
FIG. 10
FIG. 9

SLIM-LINE BRUSHLESS MOTOR

CROSS REFERENCE TO RELATED PATENT APPLICATION

The present application is related to U.S. patent application Ser. No. 08/574,007, by Horski filed on Dec. 18, 1995, entitled "Slim-Line Brushless Motor With Inside Mounted Single Bearing" and U.S. patent application Ser. No. 08/573,819, by Horski filed on Dec. 14, 1995, entitled "Brushless Motor With Inside Mounted Single Bearing".

FIELD OF THE INVENTION

The present invention relates to a brushless motor for various applications including automotive and HVAC applications. More particularly, the present invention relates to a slim-line brushless motor.

BACKGROUND OF THE INVENTION

Direct current (DC) brushless motors have been used in a variety of electronic and industrial applications such as automotive applications where the motor drives a fan to cool an automobile engine, moves a windshield wiper, or raises and lowers a window or doorlock. Conventional DC brushless motors typically include a stator comprising a core having windings, a rotor having permanent magnets, and a shaft supporting the motor with respect to the stator. Bearing assemblies are generally employed to rotatably couple the shaft to either the stator or the rotor. The bearing assemblies are necessary to counteract the radial, axial and moment forces associated with the coupling of the rotor to the stator. These motor designs often rely on a number of moving parts and free wires. Additionally, conventional DC brushless motors utilize stator coils comprised of wrapped magnetic wires (e.g., free wires). The wrapped magnetic wires engage hooks, stakes, or poles arranged in a variety of configurations. Wrapping magnetic wires requires excess space (e.g., particularly in height) and increases the assembly time associated with the stator.

Applications for DC brushless motors often require that the motor be located in small spaces. For example, in automotive application the electric motor must be placed in narrow spaces within door, hood, and trunk compartments. Such applications require that the motor has a minimal height or profile. Conventional thin DC brushless motors are difficult to assemble due to the moving parts and free wires associated with the stator. The moving parts and free wires also reduce the reliability of the motor. Therefore, there is a need for a slim-line DC brushless motor which is essentially comprised of no moving parts or free wires. Further, there is a need for a DC brushless motor structure which can be assembled by automated manufacturing techniques.

Conventional brushless motors often include electronic circuitry mounted within the motor. The electronic circuitry drives current through the windings of the stator to generate a magnetic field which effects rotation of the rotor. Such electronic circuitry generates heat which must be dissipated from the motor via large, expensive heat sinks. Thus, there is also a need for increased heat dissipation in conventional slim-line brushless motors.

SUMMARY OF THE INVENTION

The present invention relates to a slim-line brushless motor including a rotor assembly, a stator assembly, a bearing assembly and a shaft. The rotor assembly has a flat magnet, and the stator assembly has a flat winding. The bearing assembly is coupled with the stator assembly, and the shaft is disposed through the rotor assembly into the bearing assembly. The rotor assembly is rotatably coupled to the stator assembly via the shaft and the bearing assembly.

The present invention also relates to a brushless motor for automotive applications. The brushless motor also includes a rotor, a stator, a bearing, a control circuit, and a cooling fan. The rotor includes at least one flat magnet and at least one aperture. The stator includes at least one flat coil. The control circuit is coupled to the at least one flat coil, and the cooling fan is coupled to the rotor. The fan moves air through the aperture to cool the control circuit.

The present invention further relates to a brushless motor for automotive applications including a rotor, a stator, a bearing means and a hub-shaft. The rotor includes a first flat magnetic means for providing a first magnetic field. The stator includes a second flat magnetic means for providing a second magnetic field. The bearing means rotatably couples the rotor to the stator. The hub-shaft is disposed through the rotor into the bearing means.

In one exemplary aspect of the present invention, the brushless motor utilizes a flat permanent magnet and a flat coil. The flat permanent magnet is mounted inside the hub of a bell-shaped rotor housing. The flat coil is preferably a circular stamped copper member which has two layers of radial members. The radial members of the first layer are fused to radial members of the second layer to form a magnetic field generating coil.

In another exemplary aspect of the present invention, the rotor and stator of the motor are comprised of essentially stationary parts. The rotor is staked with a hub-shaft which is press fit into a bearing assembly comprised of two sleeve bearings. The bearing assembly is held between two ring elements. The ring elements are coupled to a flux ring which supports the flat coil of the stator. The mechanical orientation of the rotor, stator, hub-shaft and bearing assembly provides an easy to assemble motor design with a minimal number of moveable parts. The hub-shaft preferably has a shaft section which is the same length or shorter than the height of the bearing assembly.

According to yet another exemplary aspect of the present invention, a cooling fan can be directly coupled to the rotor to provide air flow through cooling apertures in the rotor. The air flow advantageously cools control circuitry located within the motor. The fan also covers the cooling apertures of the rotor to protect the interior of the motor.

BRIEF DESCRIPTION OF THE DRAWINGS

The invention will hereinafter described with reference to the accompanying drawings wherein like numerals denote like elements and:

FIG. 1 is a front, end view of a motor in accordance with the first exemplary embodiment of a brushless motor shown with the outline of a cooling fan set out in dashed lines;

FIG. 2 is a cross-sectional view of the motor illustrated in FIG. 1 taken along line 2—2;

FIG. 7 is a front, end view of the hub-shaft illustrated in FIGS. 1 and 2;

FIG. 8 is a side view of the hub-shaft illustrated in FIG. 7;

FIG. 9 is a rear, end view of the fan illustrated in FIG. 2; and

FIG. 10 is a cross-sectional view of the fan illustrated in FIG. 9 taken along line 10—10.

Figure 4:
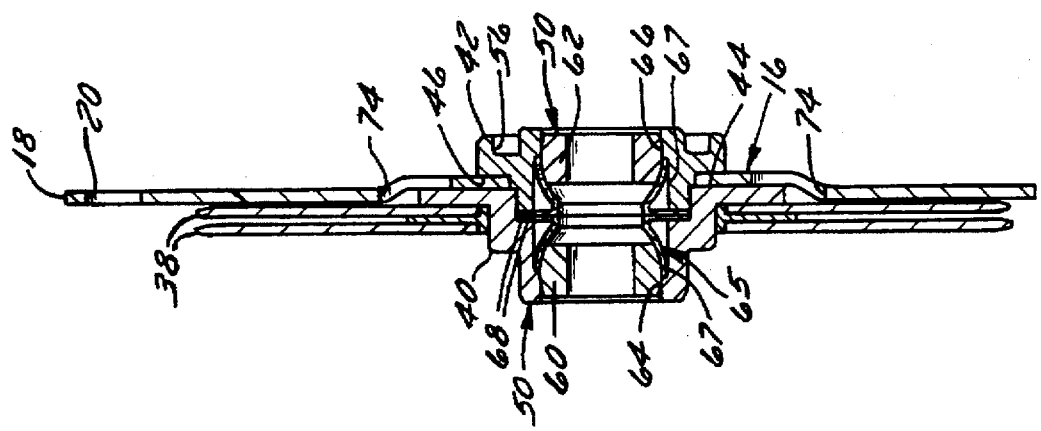
FIG. 4 is a cross-sectional view of the stator assembly illustrated in FIG. 3 taken along line 4—4.

DETAILED DESCRIPTION OF THE PREFERRED EXEMPLARY EMBODIMENT OF THE PRESENT INVENTION

With reference to FIGS. 1 and 2, a direct current (DC) brushless motor 12 includes an outer rotor assembly 14 positioned above and about an inner stator assembly 16 which is fixed to a flux ring 18. Flux ring 18 includes mounting holes 20 which allow motor 12 to be secured to an automotive chassis within the engine compartment, door compartment, hood compartment, blower unit, container or other apparatus. Rotor assembly 14 includes a bell-shaped rotor housing 22 and is staked by a hub-shaft 24 through a mounting aperture 26 to stator assembly 16. Motor 12 is shown in FIG. 1 with only the outline of a motor cooling fan 28 (see FIGS. 2, 9 and 10 for details) in dashed lines so the orientation of rotor assembly 14 with respect to stator assembly 16 can be observed more easily.

Rotor assembly 14 includes a flat, permanent magnet 32 (FIG. 2) attached to an interior surface 34 of bell-shaped rotor housing 22. Flat magnet 32 is doughnut-shaped (ring-shaped) and extends from surface 34 to just below an edge 35 of housing 22. Rotor housing 22 includes cooling apertures 36 which expose stator assembly 16 (FIG. 1).

Fan 28 is attached to hub-shaft 24 and mounted over cooling apertures 36 of rotor housing 22 (See FIG. 2). Apertures 36 allow fan 28 to force air to rotor housing 22 through stator assembly 16. Additionally, fan 28 serves to cover apertures 36 to protect the interior of motor 12.

Stator assembly 16 includes a pair of flat coils 38, a ring coupling element 40, and a ring coupling element 42. Flat coils 38 are electrically coupled in parallel and mounted proximate magnet 32. Flat coils 38 are stacked in close conformance in a side-by-side relationship with flux ring 18. Flat coils 38 are fixed to flux ring 18 and at least one of flat coils 38 is located intermediate a plane extending through edge 35 of housing 22 and ring 18.

Ring coupling elements 40 and 42 are aluminum and press fit together to capture flux ring 18. This arrangement holds flux ring 18 between a bearing surface 44 of element 40 and a bearing surface 46 of element 42. Ring coupling elements 40 and 42 are held to each other by a friction fit and locking tabs (not shown).

A bearing assembly 50 is held within the center of ring coupling elements 40 and 42. Ring coupling element 42 is mechanically fixed to an end cup 52 via tabs 54 on cup 52 which are received in grooves 56 of element 42. End cup 52 and flux ring 18 surround stator assembly 16.

Figure 3:
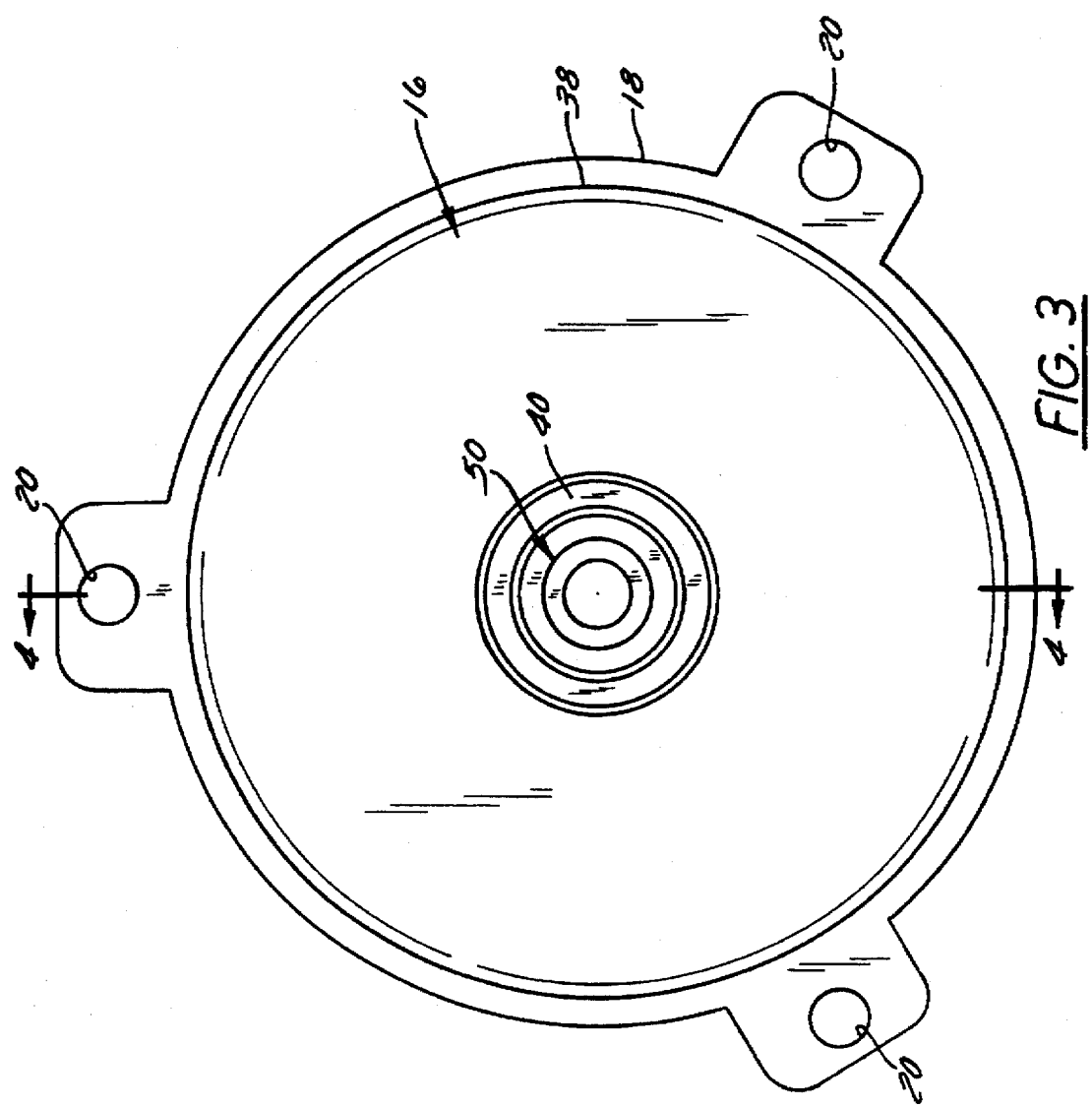
FIG. 3 is a more detailed front, end view of the stator assembly illustrated in FIGS. 1 and 2.

With reference to FIGS. 3 and 4, bearing assembly 50 includes a sleeve bearing 60 and a sleeve bearing 62. Hub-shaft 24 is preferably press fit into a sleeve bearing 60 of bearing assembly 50 and sleeve bearing 62 of bearing assembly 50. Bearing assembly 50 is positioned between a bearing seat 64 on element 40 and a bearing seat 66 on element 42. A pair of bearing retainers 68 are held between elements 40 and 42. Bearing assembly 50 includes a two-part spring 65 which biases bearings 60 and 62 away from each other. Two-part spring 65 presses against retainers 68 and holds bearings 60 and 62 against seats 64 and 66, respectively.

Hub-shaft 24 (FIGS. 1 and 2) has a diameter sized with respect to the inner diameter of bearings 60 and 62 so hub-shaft 24 is friction fit or press fit into bearing assembly 50. Hub-shaft 24 passes through aperture 26 of rotor assembly 14 and into bearing assembly 50 to rotatably couple rotor assembly 14 to stator assembly 16 with an easy to assemble connection. Alternatively, hub-shaft 24 can be integral with rotor assembly 14 or otherwise mechanically fixed to rotor housing 22 (e.g., welded). The geometry of hub-shaft 24 is discussed in more detail below with respect to FIGS. 7 and 8.

Bearing assembly 50 is preferably sized with a minimal height (e.g., approximately the same size as elements 40 and 42) and yet have enough rigidity to mitigate axial, radial and moment forces associated with the rotation of motor 12. Hub-shaft 24 is also sized for minimal height and is almost completely disposed with bearing assembly 50. Such a configuration for rotatably coupling rotor assembly 14 to stator assembly 16 provides an advantageous structure for motor 12 which can be easily manufactured in a minimal amount of height with conventional bearing components.

Stator assembly 16 includes flat windings or flat coils 38 disposed about ring coupling element 40 which is coupled to flux ring 18. Flux ring 18 includes apertures 74 (FIG. 4) which expose control circuit 70. Apertures 74 allow air flow from cooling apertures 36 to reach control circuit 70. The air flow travels from under the blades of an automotive fence (not shown, discussed below) through circuit 70, flat coils 38 and apertures 36 to fan 28.

Flat coils 38 are circular stamped copper members as distinguished from conventional planar magnetic wire stators coils. Conventional stator coils rely on stakes, posts, hooks, and other members (not shown) for holding magnetic wires. Flat coils 38 are each comprised of two layers of thin metal bars (not shown) disposed radially about a center point. A first end (the end farthest from the center point) of each metal bar on a first layer is fused with the first end of a corresponding metal bar on a second layer. A second end (the end closest to the center part) of each metal bar on the first layer is fused with the second end of an adjacent metal bar on the second layer. Therefore, the first and second layers of the metal bars of flat coils 38 are fused together to form a coil-like structure. Such a configuration provides an easy to manufacture, thin magnetic field producing device which does not require cumbersome magnetic wires.

With reference to FIGS. 1 and 2, flux ring 18 is soldered or otherwise attached to a multi-chip module (MCM) control circuit 70 (FIG. 2) located within motor 12. Control circuit 70 typically includes electronic devices, wiring, connectors and heat dissipating devices such as heat sinks 71. Alternatively, control circuit 70 can be a printed circuit board (PCB) or other electronic module. Control circuit 70 is disposed in-line with cooling apertures 36 so air flow from under blades of an automotive fan (discussed below, not shown) can reach control circuit 70. Control circuit 70 drives electric signals to or electrically commutates flat coils 38 via a connection (not shown) across flux ring 18. Circuit 70 is coupled to DC power (e.g., car battery) via appropriate terminals and conductors (not shown).

Flat coils 38 can be fused in a variety of fashions to create coils of different shapes or several coils (not shown) in a variety of orientations or configurations. After flat coils 38 are placed in stator assembly 16 around element 40, (e.g., over flux ring 18), flat coils 38 are soldered, fused, or electrically coupled to circuit 70 across flux ring 18. Flat coils 38 are electrically coupled to each other in parallel so a stronger magnetic field can be provided. However, depending upon the application, they could be coupled in series.

Figure 5:
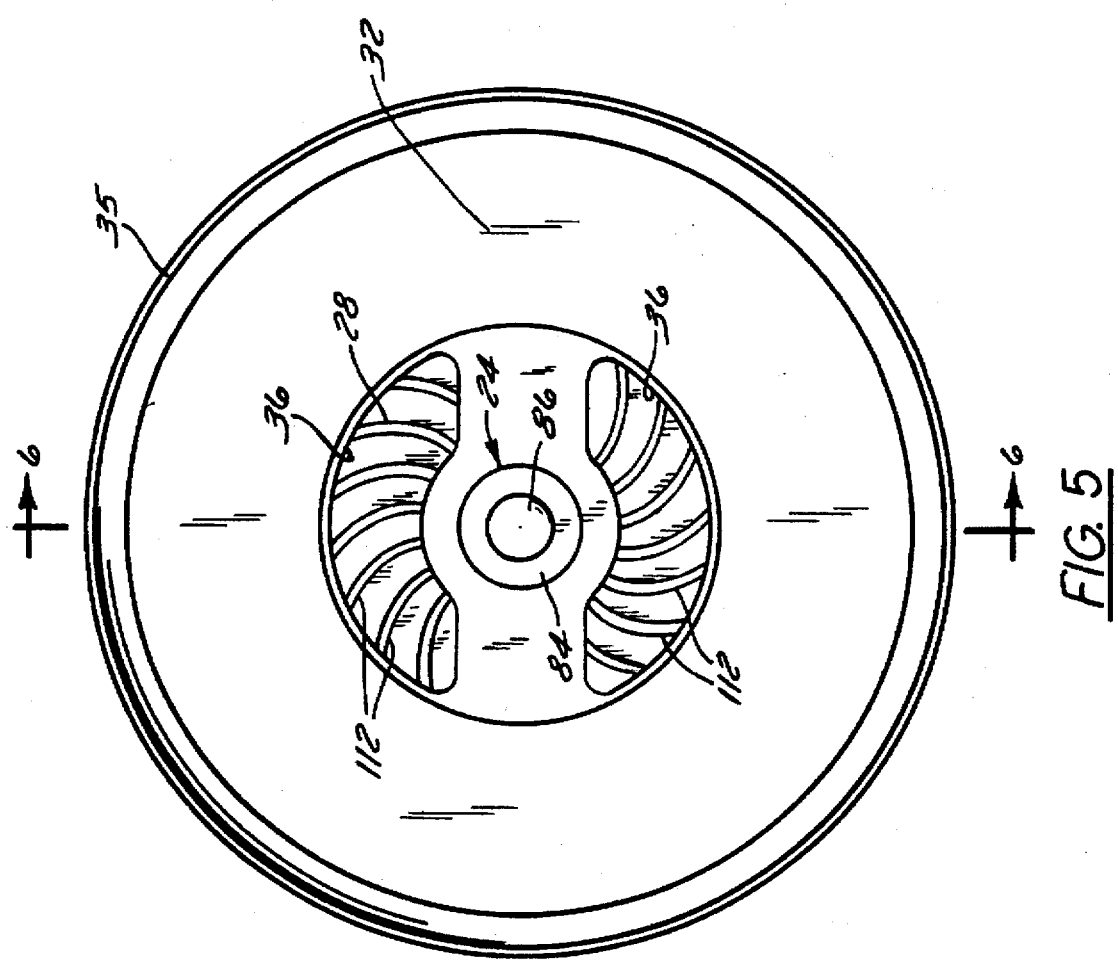
FIG. 5 is a rear, end view of the rotor assembly illustrated in FIG. 2, shown with the cooling fan attached.
Figure 6:
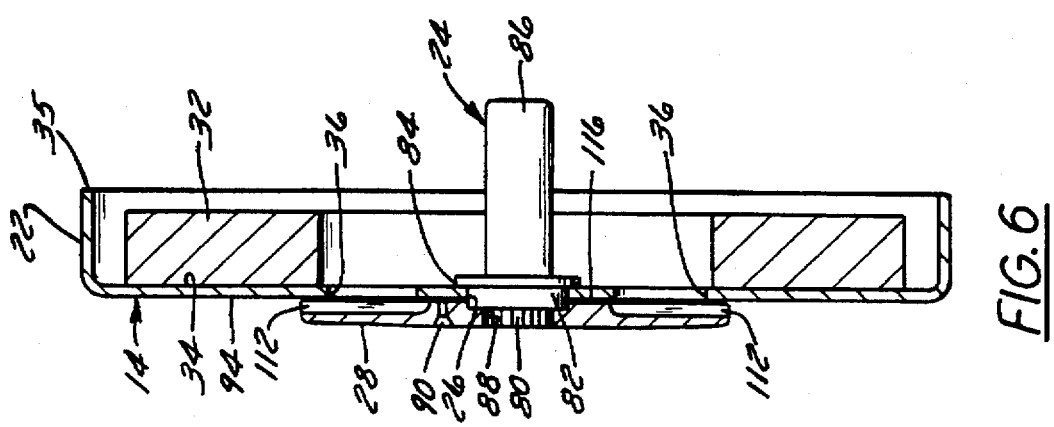
FIG. 6 is a cross-sectional view of the rotor assembly illustrated in FIG. 5 taken along line 6—6.

With reference to FIGS. 5 and 6, permanent magnet 32 of rotor assembly 14 is a single doughnut-shaped magnet. Magnet 32 does not cover cooling apertures 36 of rotor housing 22. Rotor assembly 14 is held between a bearing section 84 (FIGS. 7 and 8) of hub-shaft 24 and a side 116 (FIGS. 9 and 10) of fan 28.

With reference to FIGS. 7 and 8, hub-shaft 24 includes a knurled section 80, a hub section 82, bearing section 84, and a shaft section 86. Knurled section 80 is sized for an interference fit with a mounting aperture 88 (FIGS. 9 and 10) of fan 28. Hub section 82 is sized for an interference fit with mounting aperture 26 of rotor assembly 14. Bearing section 84 prevents rotor assembly 14 from sliding in contact with bearing assembly 50.

Shaft section 86 is preferably sized in accordance with the height of bearing assembly 50. Shaft section 86 may be slightly longer than bearing assembly 50 and extend nearly to end cap 52. Additionally, shaft section 86 may be shortened if the friction fit connection between assembly 50 and hub-shaft 24 is sufficiently rigid.

With reference to FIGS. 9 and 10, fan 28 is similar to a vacuum cleaner fan or other air flow device and includes lowered portions or fins 112. Lowered fins 112 are curved and operate to pull air through apertures 36 and 74 from control circuit 70. A mounting aperture 88 of fan 28 is dimensioned for close conformal contact with knurled section 80 of hub-shaft 24. A recess 108 of fan 28 is dimensioned to sit over hub suction 82 of hub-shaft 24. Fan 28 can operate to hold rotor assembly 14 between a bottom side 116 of fan 28 and bearing section 84 of hub-shaft 24. Additionally, fan 28 can include mounting holes 90.

A window drive (not shown) for rising and lowering a window in an automobile or a lock mechanism (not shown) for locking or unlocking a door is driven by motor 12 and can be fixed to rotor assembly 14 above cooling fan 28. Motor 12 is preferably a direct current (DC) brushless motor, and has a height or profile less than 30 mm due to the advantageous design of motor 12. (Motor 12 may be referred to as a slim-line motor which has a diameter to width ratio greater than three to one.) The window drive or lock mechanism can be coupled directly to an outside surface 92 (FIGS. 1, 2 and 6) of rotor assembly 14 via a clip, a screw, or other fastening device (not shown). Alternatively, the drive or mechanism can be form fitted to outside surface 92 of rotor assembly 14 over cooling fan 28 (FIG. 2) of motor 12 or attached to motor 12 via belts, gears, or other mechanisms. Motor 12 must be sized to fit within relatively small areas such as door compartments, hood compartments or trunk compartments.

It is understood that, while the detailed drawings, specific examples, and particular components values given describe preferred exemplary embodiment of the present invention, therefore the purpose of illustration only. The apparatus and method of the invention is not limited to the precise details and conditions disclosed. For example, although the motor includes control circuitry mounted within it, other electrical connections could be utilized. Further, although particular shapes and aperture dimensions have been shown, various other shapes, geometries and dimensions could be utilized for the various components of the motor. Thus, the changes may be made to the details disclosed without parting from the spirit of the invention which is defined by the following claims.

What is claimed is:
1. A brushless motor for driving an automotive fan, the brushless motor comprising:
    a rotor assembly having a flat magnet;
    a stator assembly having a flat coil including a first layer of conductive bars and a second layer of conductive bars, each bar of the first layer being coupled to a corresponding bar of the second layer in series to form a coil structure;
    a two piece ring assembly coupled to the stator assembly, the two piece ring assembly including a first ring and a second ring, wherein the first ring and the second ring are press fit together;
    a flux ring held between the first ring and the second ring;
    a bearing assembly coupled with the starer assembly, the bearing assembly including a first sleeve beating disposed in the first ring and a second sleeve bearing disposed in the second ring, the first sleeve bearing and the second sleeve bearing being separated by a spring; and
    a shaft disposed through the rotor assembly into the ring assembly of the bearing assembly, the rotor assembly being rotatably coupled to the stator assembly via the shaft and the bearing assembly.

2. The brushless motor of claim 1 wherein the stator assembly includes a flux ring, the flux ring being held between the first ring and the second ring.

3. The brushless motor of claim 1, further comprising a multi-chip control module mechanically coupled to the second ring.

4. The brushless motor of claim 1 wherein the first ring is coupled to the stator assembly.

5. The brushless motor of claim 1 further comprising a cooling fan fixed to an end of the shaft.

6. The brushless motor of claim 5 wherein the rotor assembly includes a plurality of vent apertures and the fan is disposed to cover the vent apertures.

7. A brushless motor for an automotive fan, the brushless motor comprising:
    a rotor including at least one flat magnet and at least one aperture;
    a stator including at least one flat coil, the flat coil including at least a first layer of conductive bars and a second layer of conductive bars, each bar of the first layer being coupled to a corresponding bar of the second layer in series to form a coil structure;
    a bearing assembly including a first sleeve bearing and a second sleeve bearing;
    a two piece ring assembly coupled to the stator, the two piece ring assembly including a first ring and a second ring, wherein the first sleeve bearing is disposed in the first ring and the second sleeve bearing is disposed in the second ring, the first sleeve bearing and the second sleeve bearing being separated by a spring, wherein the first and second ring are press fit together;
    a flux ring had between the first ring and the second ring; and
    a cooling fan coupled to the rotor, the fan providing air through the aperture to cool a control circuit.

8. The brushless motor of claim 7 further comprising a shaft disposed through the rotor and the bearing assembly, wherein the cooling fan is fit over and substantially covers an end of the shaft.

9. The brushless motor of claim 7 wherein the first sleeve bearing and the second sleeve bearing are press fit into the two piece ring assembly.

10. The brushless motor of claim 9 wherein the first ring is mechanically coupled to the stator.

11. The brushless motor of claim 9 wherein the first ring and second ring included notches for fixing the first ring to the second ring.

12. The brushless motor of claim 11 wherein the sleeve bearings are biased against bearing seats on the first and second rings.

13. The brushless motor of claim 12 wherein the two piece ring assembly includes notches for fixing the first ring to the second ring.

14. A brushless motor for automotive applications, comprising:

a rotor including a first flat magnetic means for providing a first magnetic field;

a stator including a second flat magnetic means for providing a second magnetic field, the second magnetic means including a first layer of conductive bars and a second layer of conductive bars, each bar of the first layer being coupled to a corresponding bar of the second layer in series to form a coil structure;

a two piece ring assembly coupled to the stator, the two piece ring assembly including a first ring and a second ring, the first ring and second ring being press fit together;

a flux ring held between the first ring and the second ring;

a bearing means for rotatably coupling the rotor to the stator, the bearing means including a first sleeve bearing disposed in the first ring and a second sleeve bearing disposed in the second ring, the first sleeve bearing and the second sleeve bearing being separated by a spring; and a hub-shaft disposed through the rotor means in the bearing means.

15. The brushless motor of claim 14 further comprising a control circuit coupled to the second ring.

16. The brushless motor of claim 14 wherein the first flat magnetic means is a flat permanent magnet.

17. The brushless motor of claim 14 wherein the second flat magnetic means is a flat coil.

18. The brushless motor of claim 14 further comprising a cooling fan fixed to the rotor assembly.

19. The brushless motor of claim 18 wherein the rotor assembly includes a plurality of vent apertures and the fan is disposed to cover the vent apertures.

20. The brushless motor of claim 14 wherein the first ring is coupled to the stator.

21. The brushless motor of claim 14 wherein the first ring and the second ring include bearing seats and the spring biases the sleeve bearings against the seats.

* * * * *